United States Patent [19]
Carlson et al.

[11] 3,963,856
[45] June 15, 1976

[54] FLEXIBLE, CORRUGATED, PLASTIC TUBING HAVING CONDUCTIVE HELICAL BEAD

[75] Inventors: Lennart L. Carlson, Tustin; Douglas I. Hoiberg, Fullerton, both of Calif.

[73] Assignee: Steward Plastics, Inc., Orange, Calif.

[22] Filed: Nov. 25, 1974

[21] Appl. No.: 526,671

[52] U.S. Cl. .................. 174/47; 317/2 J; 428/36; 428/222; 428/327; 428/922
[51] Int. Cl.² ........................... F16L 11/12
[58] Field of Search ............ 174/47; 317/2 J; 428/36, 222, 328, 327, 323, 922

[56] References Cited
UNITED STATES PATENTS

| | | | |
|---|---|---|---|
| 2,745,074 | 5/1956 | Darling | 174/47 |
| 2,895,001 | 7/1959 | Noyes et al. | 174/47 |
| 2,917,568 | 12/1959 | Moorman et al. | 174/47 |
| 3,166,688 | 1/1965 | Rowand | 317/2 |
| 3,457,359 | 7/1969 | Soucy | 317/2 J |
| 3,566,002 | 2/1971 | Brown | 174/47 |
| 3,652,375 | 3/1972 | Johnson | 428/328 |
| 3,749,814 | 7/1973 | Pratt | 174/47 |
| 3,828,112 | 8/1974 | Johansen et al. | 174/47 |

*Primary Examiner*—William J. Van Balen
*Assistant Examiner*—William R. Dixon, Jr.
*Attorney, Agent, or Firm*—Harris, Kern, Wallen & Tinsley

[57] ABSTRACT

The combination of a flexible, thin-walled plastic tube having thereon an external, electrically conductive, helical bead which is formed of a plastic mixed with a conductive material and which is heat sealed to the plastic of the tube. Electrical conductors are electrically connected to the bead adjacent the ends of the tube. The bead is normally opaque and the tube transparent. However, the tube may also contain a conductive material and be opaque.

12 Claims, 11 Drawing Figures

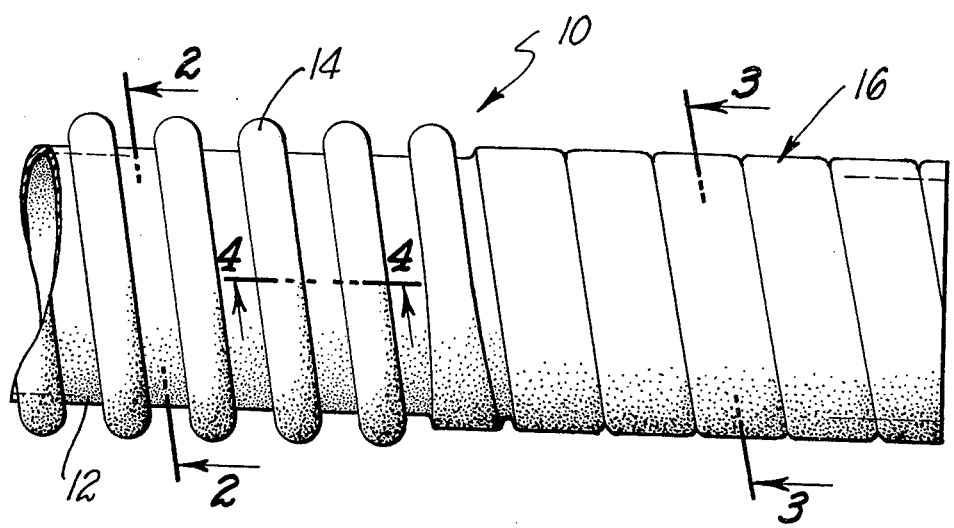
Fig. 1.
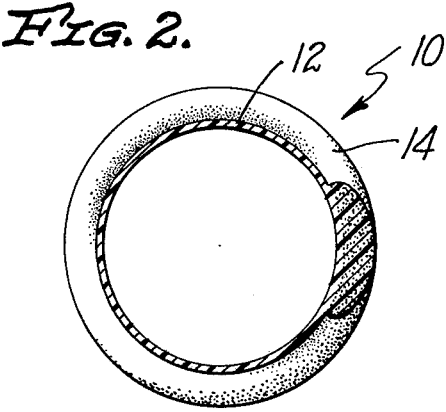 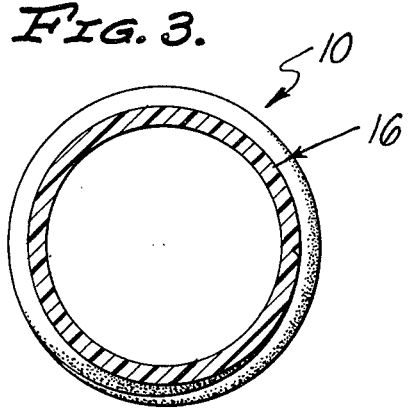
Fig. 2.  Fig. 3.
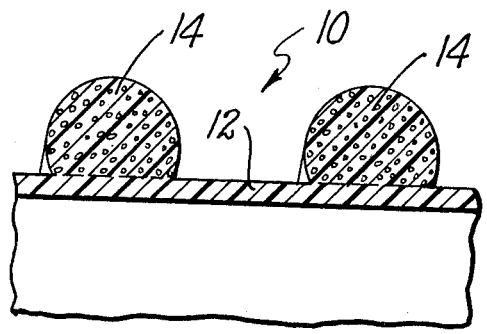 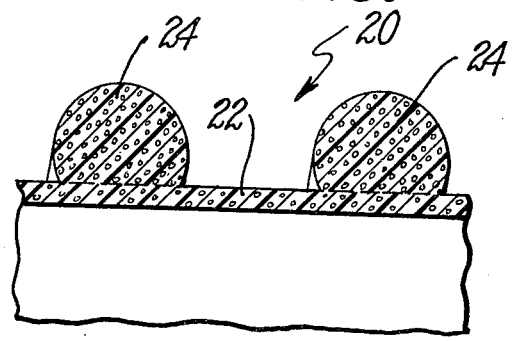
Fig. 4.  Fig. 5.

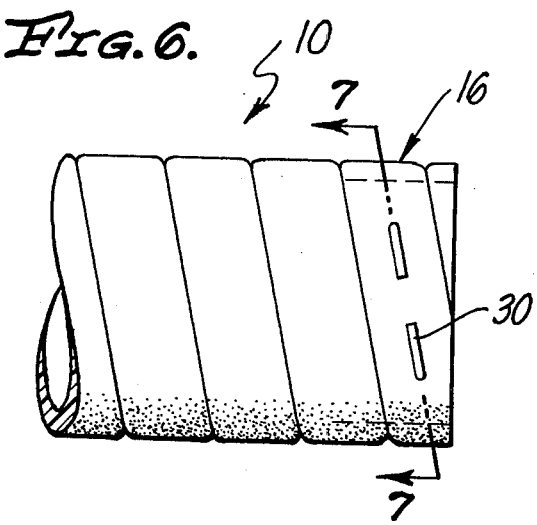
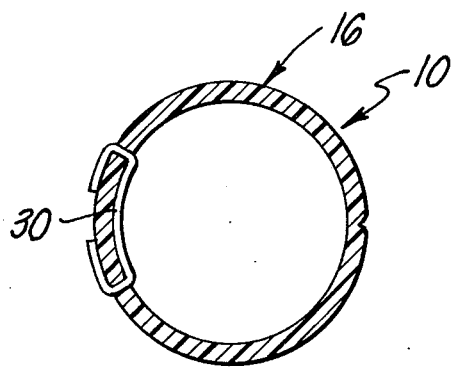
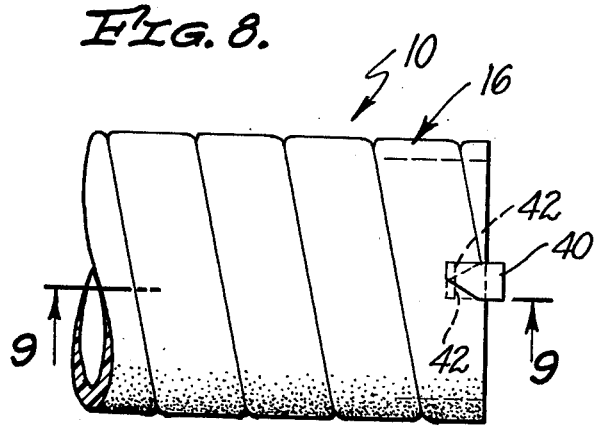
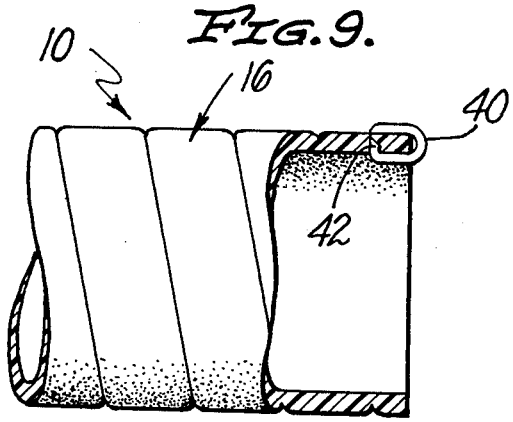
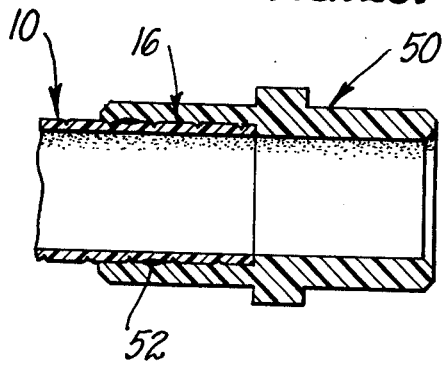
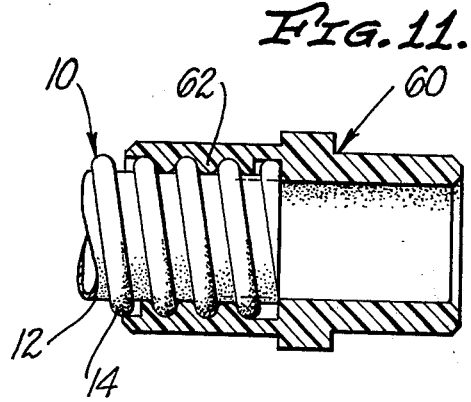

FLEXIBLE, CORRUGATED, PLASTIC TUBING HAVING CONDUCTIVE HELICAL BEAD

BACKGROUND OF INVENTION

The present invention relates in general to a corrugated plastic tubing which is electrically conductive. Such electrical conductivity is particularly desirable to dissipate static electricity when the tubing is used to conduct oxygen, thereby minimizing any fire hazard. However, conductive plastic tubings may be used for other purposes as well.

The tubing is externally corrugated, by means of an external helical bead, to provide the tubing with sufficient stiffness to avoid collapse while still maintaining flexibility by utilizing a relatively thin wall between convolutions of the bead.

Prior U.S. patents having some pertinence to the present invention are:

| | |
|---|---|
| 3,070,132 | Sheridan |
| 3,166,688 | Rowand et al |
| 3,290,426 | Barrentine |
| 3,532,580 | Kanao |
| 3,645,834 | McCaffrey |

Sheridan, Rowand et al, Barrentine and McCaffrey all disclose tubings or pipes of dielectric material having longitudinally extending, electrically conductive inserts. The formation of such inserts creates problems in the manufacture of the tubings, and the inserts, being relatively narrow, result in relatively long, circumferential dielectric paths for the transfer of static charges to the conductive inserts.

Kanao discloses a method and apparatus of forming a plastic tubing having thereon an external helical bead. FIG. 8 of Kanao shows a reinforcement 62' of an unspecified material embedded in the helical bead.

Also of interest is Steward patent application Ser. No. 469,234, filed May 13, 1974, assigned to the same assignee as this application, and a continuation of Ser. No. 284,944, filed Aug. 30, 1972, and now abandoned. Steward discloses a method and apparatus of forming a plastic tubing having thereon an external helical bead.

SUMMARY AND OBJECTS OF INVENTION

The present invention may be summarized as comprising, and the primary object of the invention is to provide a tubing which comprises: a flexible, thin-walled plastic tube; and an electrically conductive, helical bead on the exterior of the tube.

More particularly, the primary object of the invention is to provide a flexible, corrugated, electrically conductive, plastic tubing of the foregoing nature wherein the bead is formed of a plastic mixed with a conductive material and heat sealed to the plastic of the tube. Any desired conductive material may be used, such as carbon black, metal powder, or the like, and the conductive material preferably comprises a major portion of the mixture forming the bead.

Preferably, the conductive mixture is formed into the desired helical bead on the plastic tube by extruding the bead onto the tube while the latter is displaced axially, whereby the desired helix is formed. By extruding the heated bead mixture onto a heated tube which is simultaneously displaced axially, the bead is bonded to the tube by heat sealing, which is an important feature.

One way of forming the tubing of the invention is to employ two extruders, one being utilized to continuously form a thin-walled plastic tube of substantially constant wall thickness which is displaced axially as it is formed, and the other extruder being utilized to deposit the electrically conductive bead mixture on the plastic tube while it is being displaced axially and while it is still hot. For example, an apparatus similar to that shown by Steward may be utilized to form the basic plastic tube, except that such tube is formed with a substantially constant wall thickness.

In one form of the invention, an important object is to make the tube on which the electrically conductive helical bead is formed of a transparent plastic material so that the interior of the tube may be viewed through the portions thereof between the convolutions of the helical bead. This is desirable in installations where it is advisable to be able to inspect the interior of the plastic tube for the presence of moisture, as in anesthetic or oxygen delivery systems to patients in hospitals, for example.

An important feature of the invention is that, by providing an electrically conductive helical bead with relatively closely spaced convolutions, very short dielectric paths for the dissipation of static electricity are provided.

An important object in connection with another embodiment of the invention is to provide a tubing of the foregoing nature wherein the plastic of the inner tube also contains an electrically conductive material, but in a smaller proportion than the proportion of the electrically conductive material in the bead. With this construction, extremely effective dissipation of static charges is achieved, which is an important feature.

Another object of the invention is to provide a tubing as hereinbefore described wherein the electrically conductive helical bead is flattened at the ends of the tubing, as disclosed in the aforementioned Steward application, to receive suitable end connections.

A further object is to provide electrical conductors electrically connected to the bead at the ends of the tubing, which conductors may be suitably grounded.

Other objects are to provide a construction wherein the conductors are simply staples extending through the bead and the tube at the ends of the tubing, or clips extending through the bead and the tube at the ends of the tubing, or metallic tape applied to the tubing ends. Also, conductivity can be provided by making the tubing smaller internally than required initially and then removing the nonconductive film inside a portion of each end by machining, or other suitable means. Still another object is to provide a construction wherein the electrical conductors at the ends of the tubing are fittings which enclose the tubing ends, such conductors either being telescoped over and bonded to flattened end portions of the bead, or being threaded on end portions of the bead. Such conductors may either be metallic, or plastic containing a major proportion of conductive materials.

An important feature of the invention is that the conductive material incorporated in the tubing increases the tubing stiffness. By properly proportioning the materials of the bead and the inner tube, the bead can provide substantial over-all stiffness while leaving the inner tube quite flexible to permit short-radius bends in the over-all tubing. With this construction, the inner tube can be quite thin without any danger of collapsing or kinking under the influence of short-radius bends. Also, the conductive material incorporated in the helical bead tends to provide such bead with greater abrasion resistance than plastic alone.

Still another feature of the invention is that the construction hereinbefore outlined utilizes less plastic than an all-plastic bead, and is thus less expensive.

A further advantage is that the inner tube can be provided with a very thin wall to minimize the weight of the over-all tubing. This provides less discomfort to a patient when the tubing is used to provide the patient with oxygen, for example.

Another object of the invention is to make the interior surface of the inner tube smooth so that it does not tend to pick up contaminants. Also, the inner tube may be formed of a plastic material which is nonwettable and which thus will not pick up and retain moisture, or other liquids. By using an inert plastic material for the inner tube which contains no filler, there is no danger of contaminating the liquid or gas, such as oxygen, flowing through the tubing.

The foregoing objects, advantages, features and results of the present invention, together with various other objects, advantages, features and results thereof which will be evident to those skilled in the art to which the invention relates in the light of this disclosure, may be achieved with the exemplary embodiments of the invention illustrated in the accompanying drawings and described in detail hereinafter.

DESCRIPTION OF DRAWINGS

FIG. 1 is a fragmentary elevational view of a flexible, corrugated, plastic tubing having an electrically conductive helical bead;

FIGS. 2 and 3 are transverse sectional views respectively taken as indicated by the arrowed lines 2—2 and 3—3 of FIG. 1;

FIG. 4 is an enlarged, fragmentary, longitudinal sectional view taken as indicated by the arrowed line 4—4 of FIG. 1;

FIG. 5 is a view similar to FIG. 4, but showing an alternative wherein the inner plastic tube, as well as the external helical bead, contains a conductive material;

FIG. 6 is a fragmentary view of one end of a tubing of the invention showing one possible form of an electrical conductor electrically connected to the helical bead at one end of the tubing;

FIG. 7 is a transverse sectional view taken as indicated by the arrowed line 7—7 of FIG. 6;

FIG. 8 is a view similar to FIG. 6, but showing an alternative embodiment;

FIG. 9 is a longitudinal sectional view taken as indicated by the arrowed line 9—9 of FIG. 8;

FIG. 10 shows an electrically conductive end fitting telescoped over and suitably bonded to an end of the tubing of the invention, the helical bead being flattened at such end of the plastic tubing; and FIG. 11 is a view similar to FIG. 10, but showing an electrically conductive end fitting threaded onto the external helical bead at one end of the tubing of the invention.

DESCRIPTION OF EXEMPLARY EMBODIMENTS OF INVENTION

Referring initially to FIGS. 1 to 4 of the drawings, illustrated therein is a flexible, corrugated, plastic tubing 10 of the invention which includes a flexible, thin-walled, transparent, plastic tube 12 having on the exterior thereof an electrically conductive, helical bead 14.

The tube 12, which may be formed of a material such as polyethylene, has a substantially constant wall thickness of, for example, no more than about 0.010 inch. Such a wall thickness is particularly desirable when the tubing 10 is used in hospital oxygen systems to provide the desired degree of flexibility and lightness in weight.

The bead 14 may be composed of the same or a different plastic containing a major proportion of an electrically conductive material, such as carbon black, metal powder, or the like. Preferably, the bead 14 is heat sealed to the tube 12. This may be accomplished by extruding the bead 14 onto the tube 12 while the latter is hot and is being displaced axially, as hereinbefore set forth in more detail.

The tubing 10 may be provided at each end thereof with an end portion 16 wherein the bead 14 is flattened to facilitate connection to any suitable apparatus, or to accommodate an end fitting, such as that shown in FIG. 10 and described hereinafter. The end portion 16 may be formed in the manner disclosed in Steward.

The tubing 10, with transparent helical portions of the tube 12 exposed between the helical convolutions of the opaque bead 14, has all of the various advantages hereinbefore discussed, which advantages need not be repeated here.

Referring to FIG. 5, illustrated therein is a tubing 20 which is similar to the tubing 10 and includes an inner tube 22 and an outer, helical, electrically conductive bead 24. The tubing 20 differs from the tubing 10 in that the tube 22 also includes a plastic impregnated with an electrically conductive material, preferably in a smaller proportion than the proportion of electrically conductive material in the bead 24. With this construction, dissipation of static charges is facilitated even more, as hereinbefore set forth in detail.

In order to permit grounding of the tubing 10, or the tubing 20, the tubing is provided at one or both, and preferably both, ends of the tubing with electrical conductors electrically connected to the bead 14, or the bead 24. In use, such conductors are suitably grounded. Various forms of such electrical conductors are shown in FIGS. 6 to 11 of the drawings.

Referring first to FIGS. 6 and 7, illustrated therein is an electrical conductor 30 which is simply a staple driven through the tube 12 and the bead 14 in the flattened end portion 16 thereof. A ground wire, not shown, may be suitably connected to the staple 30.

In FIGS. 8 and 9 is shown an electrical conductor 40 which is simply a U-shaped clip having at the ends of its arms prongs 42 driven into the bead 14 in the flattened end portion 16 thereof, and also into the tube 12.

Turning to FIG. 10 of the drawings, illustrated therein is an end fitting 50 telescoped over a flattened end portion 16 of the tubing 10 and suitably bonded thereto, as indicated at 52. The end fitting 50 is, of course, electrically conductive, and may be metallic, or formed of a plastic impregnated with an electrically conductive material, preferably with a major proportion of such material. The bond 52 may be adhesive in nature, or, in the case of a plastic end fitting 50, the bond 52 may be of the heat seal type.

In FIG. 11 of the drawings is shown an end fitting 60 having a coarse internal thread 62 complementary to the external helical bead 14. The end fitting 60 is simply threaded on an unflattened end portion of the tubing 10. As will be apparent, the threaded connection between the tubing 10 and the end fitting 60 provides good electrical contact between the end fitting and the conductive bead 14.

Various features and advantages of the present invention have already been set forth herein in considerable detail so that repetition is unnecessary. Although exemplary embodiments of the invention have been disclosed for illustrative purposes, it will be understood that various changes, modifications and substitutions may be incorporated in such embodiments without departing from the invention as hereinafter claimed.

We claim as our invention:

1. In a flexible, corrugated, electrically conductive, plastic tubing, the combination of:
   a. a flexible, thin-walled synthetic organic plastic tube;
   b. an electrically conductive, helical bead on and secured to the outer surface of said tube;
   c. said bead being a flexible synthetic organic plastic having mixed therewith an electrically conductive particulate material;
   d. said bead, and the outer surface of said tube intermediate the convolutions of said bead, constituting the outer surface of said tubing; and
   e. the inner surface of said tube constituting the inner surface of said tubing.

2. A tubing as set forth in claim 1 wherein said bead is heat sealed to the outer surface of said tube.

3. A tubing as defined in claim 2 wherein said tube is transparent and said bead is opaque.

4. A tubing as set forth in claim 2 wherein the plastic of said tube also contains an electrically conductive particulate material, but in a smaller proportion than the proportion of electrically conductive particulate material in said bead.

5. A tubing according to claim 2 wherein said bead is flattened at the ends of the tubing.

6. The combination set forth in claim 2 including an electrical conductor electrically connected to said bead at one end of the tubing.

7. The combination defined in claim 6 wherein said conductor is a staple extending through said bead and said tube.

8. The combination defined in claim 6 wherein said conductor is a clip extending into said bead and said tube.

9. The combination defined in claim 6 wherein said conductor encloses an end of the tubing.

10. The combination set forth in claim 9 wherein said conductor is telescoped over a flattened end portion of said bead.

11. The combination set forth in claim 9 wherein said conductor is threaded on an end portion of said bead.

12. The combination set forth in claim 2 wherein the conductive material is exposed within at least one end of the tubing.

* * * * *